US008489369B2

United States Patent
Lane et al.

(10) Patent No.: US 8,489,369 B2
(45) Date of Patent: Jul. 16, 2013

(54) METHODS FOR CALCULATING MULTIMODE FIBER SYSTEM BANDWIDTH AND MANUFACTURING IMPROVED MULTIMODE FIBER

(75) Inventors: Brett Lane, Hinsdale, IL (US); Jose M. Castro, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 360 days.

(21) Appl. No.: 12/869,501

(22) Filed: Aug. 26, 2010

(65) Prior Publication Data

US 2011/0054861 A1    Mar. 3, 2011

Related U.S. Application Data

(60) Provisional application No. 61/237,827, filed on Aug. 28, 2009.

(51) Int. Cl.
*G06F 17/10* (2006.01)

(52) U.S. Cl.
USPC .............. 703/2; 703/3; 703/4; 703/13; 385/1; 385/2; 385/3; 356/3; 356/29; 359/237; 359/326; 359/333; 398/9; 398/43

(58) Field of Classification Search
USPC .............................. 356/317, 327, 477; 702/28
See application file for complete search history.

(56) References Cited

U.S. PATENT DOCUMENTS

| | | | |
|---|---|---|---|
| 6,400,450 | B1 | 6/2002 | Golowich et al. |
| 6,788,397 | B1 | 9/2004 | Golowich et al. |
| 2002/0176071 | A1 | 11/2002 | Fontaine |

FOREIGN PATENT DOCUMENTS

WO    03025645 A2    3/2003

OTHER PUBLICATIONS

Lim et al. Strain and Temperature Sensors Using Multimode Optical Fiber Bragg Gratings and Correlation Signal Processing, IEEE Transactions on Instrumentation and Measurement, vol. 51, No. 4, Aug. 2002.*
International Wire & Cable Symposium, "Understanding Multimode Bandwidth and Differential Mode Delay Measurements and Their Applications", Dec. 31, 2002 (8 pages).
SPIE, "Advanced Multimode Fiber for High Speed, Short Reach Interconnect", Nov. 11, 2008 (15 pages).

* cited by examiner

*Primary Examiner* — Saif Alhija
*Assistant Examiner* — Cuong Luu
(74) *Attorney, Agent, or Firm* — Robert A. McCann; Christopher S. Clancy; Yuri Astvatsaturov

(57) ABSTRACT

An improved algorithm for calculating multimode fiber system bandwidth which addresses both modal dispersion and chromatic dispersion effects is provided. The radial dependence of a laser transmitter emission spectrum is taken into account to assist in designing more effective optical transmission systems.

11 Claims, 13 Drawing Sheets a)

FIGS. 2A, 2B, and 2C

METHODS FOR CALCULATING MULTIMODE FIBER SYSTEM BANDWIDTH AND MANUFACTURING IMPROVED MULTIMODE FIBER

CROSS-REFERENCES TO RELATED APPLICATIONS

The Present Application claims the benefit of U.S. Provisional Patent Application No. 61/237,827, entitled "METHODS FOR CALCULATING MULTIMODE FIBER SYSTEM BANDWIDTH AND MANUFACTURING IMPROVED MULTIMODE FIBER," filed Aug. 28, 2009, the content of which is hereby incorporated herein in its entirety.

The present application incorporates in their entireties U.S. patent application Ser. No. 12/627,752, entitled "MULTIMODE FIBER HAVING IMPROVED INDEX PROFILE," filed Nov. 30, 2009; U.S. patent application Ser. No. 12/797,328, entitled "DESIGN METHOD AND METRIC FOR SELECTING AND DESIGNING MULTIMODE FIBER FOR IMPROVED PERFORMANCE," filed Jun. 9, 2010; U.S. patent application Ser. No. 12/859,629, entitled "MODIFIED REFRACTIVE INDEX PROFILE FOR LOW-DISPERSION MULTIMODE FIBER," filed Aug. 19, 2010; and U.S. patent application Ser. No. 12/858,210, entitled "SELF-COMPENSATING MULTIMODE FIBER," filed Aug. 17, 2010.

BACKGROUND

Differential mode delay (DMD) and effective modal bandwidth (EMB) are the two industry-standardized metrics used to quantify the bandwidth of laser-optimized multimode fiber optic cable (MMF). Laser-optimized fibers are equivalently called OM3 (fiber type A1a.2) and OM4 (fiber type A1a.3). The measurement and calculation procedure for both DMD and EMB is documented in domestic standard TIA-455-220-A and international standard IEC 60793-1-49. TIA-455-220-A and IEC 60793-1-49 are substantially equivalent and are used interchangeably in this disclosure.

The currently standardized algorithms for determining DMD and EMB are adequate for appraising the quantitative amount of modal dispersion of a particular fiber at a particular measurement wavelength. However, they do not correctly address both modal and chromatic dispersion effects, hence EMB cannot accurately be employed in optical communication system models used to estimate limitations and capabilities (e.g., bit-error-rate (BER), supported optical link length). A well known and often referenced system model is the IEEE 10 Gbps link model freely available for download at: http://www.ieee802.org/3/ae/public/adhoc/serial_pmd/documents/10GEPBud3_1_16a.xls which incorrectly estimates the effects due to modal and chromatic dispersion as only additive. Panduit Laboratories has found numerous deviations from the conventional perceived proportional relationship between EMB and system performance (BER). With reference to FIG. 1, it should be noted that the relationship between system performance (BER) and fiber bandwidth is not linear but simply proportional.

U.S. Provisional Patent Application Ser. No. 61/187,137 describes an improved algorithm for calculating the DMD by accounting for the relative shift of the fiber's responses at various radial offsets (magnitude and delay). However, this improvement cannot be advantageously employed to: 1) provide a more accurate bandwidth metric to be used in communication system models; or 2) provide a means that allows modal and chromatic dispersion to be compensated without knowledge of the laser transmitter's fiber-coupled spectral distribution across the fiber core. What is needed is an improved algorithm for calculating the bandwidth of a particular laser transmitter and fiber combination.

For reference, a standardized algorithm for determining the EMB, is summarized as follows in the following six steps and demonstrated herein in Example 1. It is outside the scope of this disclosure to document the comprehensive list of requirements requisite for determining the EMB. Reference is made to TIA-455-220-A for additional information.

In a first step of the standardized algorithm, a DMD measurement apparatus is used to measure the temporal responses of the fiber, $U(r,t)$, to spectrally narrow and temporally short pulses of light with central wavelength, $\lambda_c$, injected into the fiber core at a series of radial offsets, r (typically r=0, 1, 2, 3, . . . , 25 μm for 50 μm MMF fiber). Since $U(r,t)$ is function of wavelength, the final result, EMB, will also be a function of wavelength. Implicit to the DMD and EMB measurement procedure, is the fact that the measurement is only to quantify the effects of modal dispersion at a given wavelength, $\lambda_c$. The temporal response of the launch pulse is $R(t)$.

In a second step of the standardized algorithm, the weighted responses of the fiber, $D(r,t,n)$, is computed with a number, n, of DMD weighting functions, $W(r,n)$. The DMD weighting function(s) is derived from the nearfield data of n laser sources and is employed to emphasize the effects of modal dispersion in the regions of the fiber where the laser source excites the fiber. For additional information on how to determine the weighting function for a particular laser given the laser nearfield, refer to TIA-455-220-A. If the precise bandwidth of a particular fiber and a single laser source (n=1) is to be computed, $D(r,t,1)$, is entirely a function of the nearfield of the single laser source. Alternatively, a large of number of DMD weighting functions, representative of lasers used for a particular application (e.g. 10 GBASE-SR Ethernet), may be employed to provide a range of computed bandwidths. In TIA-455-220-A, ten (n=10) such DMD weighting functions, $W(r,10)$ are employed. Generally the weighted responses of the fiber, $D(r,t,n)$ are given by:

$$D(r,t,n)=U(r,t)W(r,n) \quad (1)$$

In a third step of the standardized algorithm, the resultant output pulse, $P_o(t,n)$, is computed by summing the weighted response, $D(r,t,n)$ across all r.

$$P_o(t,n)=\Sigma_r D(r,t,n)=\Sigma_r U(r,t)W(r,n) \quad (2)$$

In a fourth step of the standardized algorithm, the fiber modal dispersion transfer function, $H_{md}(f,n)$, is computed and the calculated effective modal bandwidth, EMBc(n) is determined. The fiber modal dispersion transfer functions are determined by deconvolving the launch pulse, $R(t)$, from the resultant output pulse, $P_o(t,n)$.

$$H_{md}(f,n)=FT\{P_o(t,n)\}/FT\{R(t)\} \quad (3)$$

where FT is the Fourier Transform function and the EMBc(n) is defined as the minimum frequency at which point the fiber modal dispersion transfer function, $H_{md}(f,n)$, intersects a predetermined threshold value (often times equal to −3 dB). The fiber modal bandwidth may be normalized by fiber length to provide a measure of normalized fiber modal bandwidth (in units of MHz·km).

In TIA-455-220-A, where n=10, the minimum of the ten calculated normalized fiber bandwidths, EMBc(1, 2, 3, . . . , 10) is defined as the minimum EMBc (minEMBc) and is viewed to be the minimum modal bandwidth a particular fiber and a laser transmitter (represented by the ten DMD weighting functions). Furthermore, the minEMBc may be compared against fiber standard specification requirements for modal dispersion. The effective modal bandwidth (EMB) is defined as: EMB=1.13×minEMBc. For OM3 fiber, TIA-492AAAC-A requires minEMBc>1770 MHz·km and for OM4 fiber, TIA-492AAAD will require minEMBc>4159 MHz·km.

In a fifth step of the standardized algorithm, in order to compute the total bandwidth of a fiber and laser source, with non-zero spectral width, the effects of chromatic dispersion are combined with the effects of modal dispersion. In TIA-455-220-A the fiber chromatic dispersion transfer function, $H_{cd}(f)$ is calculated by multiplying the laser transmitter emitting spectrum, $L(\lambda)$, and the fiber's wavelength dependence of the time of flight, $TOF(\lambda_c)$.

$$H_{cd}(f)=FT\{L(\lambda)TOF(\lambda_c)\} \quad (4)$$

The measurement procedure described in TIA-455-168-A may be used to measure the fiber's wavelength dependence of the time of flight, $TOF(\lambda_c)$. It is expected that the relative time of flight, $TOF(\lambda_c)$ will be linear over the relatively small range of wavelengths under consideration (i.e. 840 to 860 nm) and thus linear interpolation may be employed without significant loss of accuracy. Finally, TIA-455-168-A specifies an overfilled launch condition and since it has been found experimentally that the slope of the relative time of flight versus wavelength is not a strong function of radial offset, r, an overfill launch condition may be used. An overfilled launch condition is defined as a launch condition that completely excites all of the supported modes of the fiber.

The measurement procedure described in TIA-455-127-A may be used to measure the laser transmitter emitting spectrum $L(\lambda)$. It is essential to note, as will be readily appreciated later, that using the prescribed measurement procedure for measuring the laser transmitter emission spectrum, does not provide any information on the spatial location of the laser's various spectral components within the fiber core. This is the reason that the prior art algorithm is not suitable for providing an accurate method of quantifying bandwidth.

In a sixth step of the standardized algorithm, the total fiber transfer functions, $H_{fiber}(f,n)$, and total calculated bandwidth, CB(n) are computed by combining the effects of modal dispersion and chromatic dispersion with the convolution of $H_{md}(f,n)$ and $H_{cd}(f)$.

$$H_{fiber}(f)=H_{md}(f,n)\cdot H_{cd}(f) \quad (5)$$

where CB(n) may be determined in a similar manner as described previously for EMBc(n).

Unfortunately, the standardized algorithm is an oversimplification originating from the loss of spatial resolution of the fiber coupled spectrum within the fiber core. The standardized algorithm assumes a uniform spectral distribution across the fiber core. Without this information, the pulse broadening and time delay (phase shift) effects of chromatic dispersion operate homogeneously across all temporal responses of the fiber and any differential time delay (phase shift) effects across the core resulting from chromatic dispersion are not accounted for. Consequently, when utilizing the standardized algorithm, the magnitudes of modal dispersion and chromatic dispersion effects can only be additive and never subtractive.

It would be desirable to have an improved bandwidth calculation algorithm that can correctly combine both modal and chromatic dispersion effects by accounting for the inhomogeneous nature of fiber coupled wavelengths across the core radius.

SUMMARY

In one aspect, a computer program stored on a computer readable storage medium for carrying out a method for calculating a bandwidth of a laser source and a multimode fiber optic cable is provided. The method accounts for both modal and chromatic dispersion effects within the multimode fiber optic cable. The method includes, but is not limited to, measuring temporal responses of the multimode fiber optic cable, U(r,t), using spectrally narrow and temporally short pulses of light with a central wavelength, $\lambda_c$, injected into a core of the multimode fiber optic cable at series of radial offsets, r from the core. The method also includes, but is not limited to, computing a plurality of fiber chromatic dispersion transfer functions, $H_{cd}(f,r)$ and outputting a total calculated bandwidth, CB(n) which was computed using the plurality of fiber chromatic dispersion transfer functions, $H_{cd}(f,r)$, on a display.

In one aspect, a method for designing an improved multimode fiber optic cable which compensates for a radially dependent wavelength distribution of laser launch modes coupled into a reference multimode fiber optic cable is provided. The method includes, but is not limited to, measuring temporal responses of a reference multimode fiber optic cable, U(r,t), using spectrally narrow and temporally short pulses of light radiation launched into the reference multimode fiber optic cable using a laser. The pulses of light have a central wavelength, $\lambda_c$, and the pulses of light are launched into a core of the reference multimode fiber optic cable at series of radial offsets, r from the core. The method also includes, but is not limited to, computing a plurality of fiber chromatic dispersion transfer functions, $H_{cd}(f,r)$. The method also includes, but is not limited to, determining an amount of modal dispersion within the reference multimode fiber optic cable resulting from the pulses of light radiation launched into the reference multimode fiber optic cable by using the plurality of fiber chromatic dispersion transfer functions. The method also includes, but is not limited to, designing the improved multimode fiber optic cable having an improved refractive index profile which compensates for at least a portion of the radially dependent wavelength distribution of laser launch modes coupled into the reference multimode fiber optic cable.

In one aspect, a method for designing an improved multimode fiber optic cable which compensates for a radially dependent wavelength distribution of laser launch modes of a reference laser is provided. The method includes, but is not limited to, computing a plurality of fiber chromatic dispersion transfer functions, $H_{cd}(f,r)$. The method also includes, but is not limited to, computing an amount of modal dispersion effects within the improved multimode fiber optic cable needed to cancel chromatic dispersion effects within the improved multimode fiber optic cable and maximize bandwidth of the improved multimode fiber optic cable using the plurality of fiber chromatic dispersion transfer functions.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by providing an improved algorithm having a method for calculating the bandwidth of a fiber and laser transmitter combination that incorporates the fiber-coupled spectral distribution across the fiber core, modal dispersion effects as well as radially dependent chromatic dispersion effects, also known as material dispersion effects, may be accounted for. In one embodiment of the present invention, an algorithm for determining the bandwidth of a particular fiber and a population of statistically representative laser transmitters that may be used to determine a bandwidth range, and perhaps a minimum bandwidth of a fiber and a population of laser transmitters. This latter embodiment is similar to a method presently described in TIA-455-220-A for determining a minimum bandwidth that a particular fiber and a group of laser transmitters may be combined to have. But this prior method would not have taken into account the radial dependencies that the present invention includes.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 19:
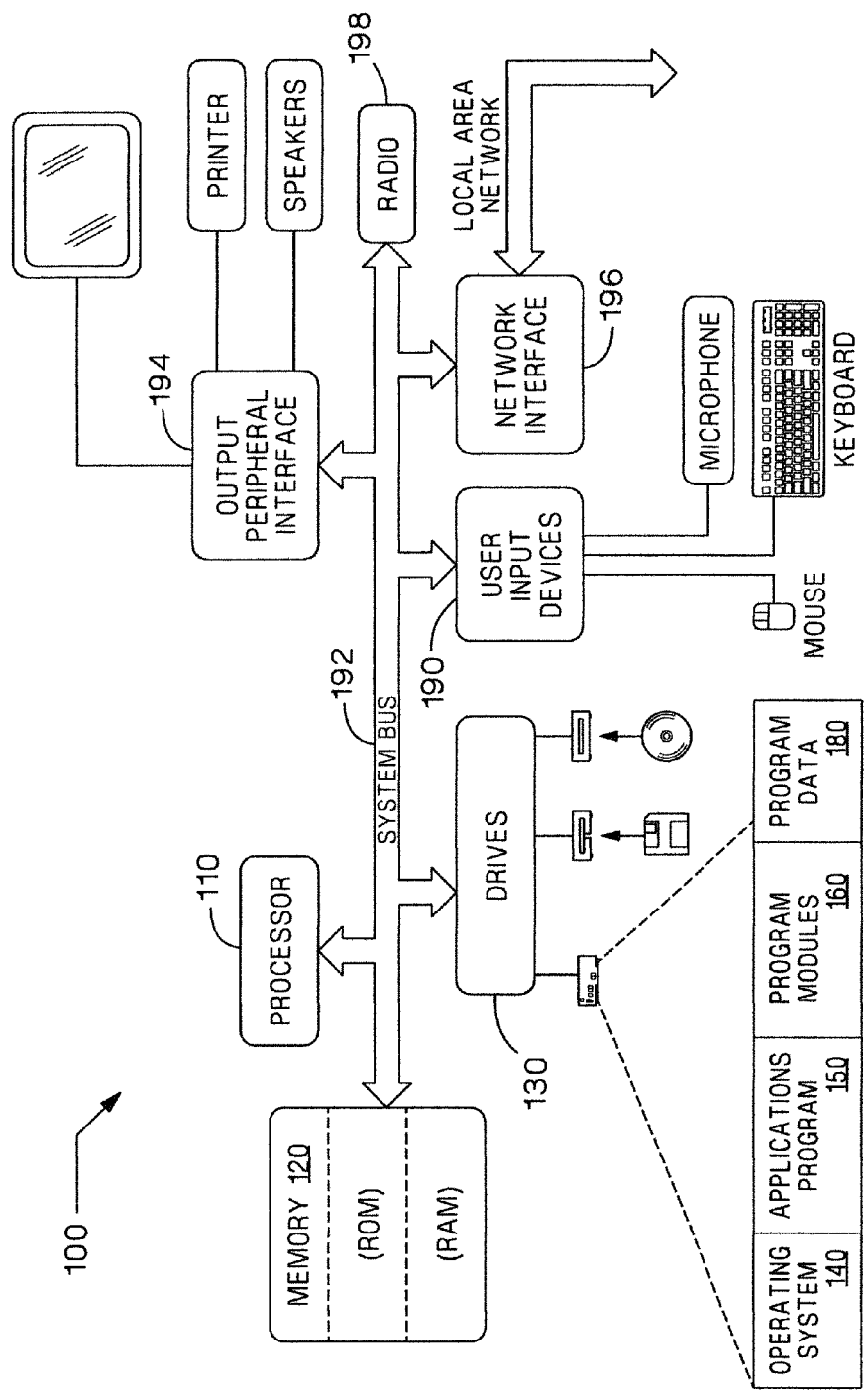
FIG. 19 depicts a block schematic diagram of an exemplary computing system, in accordance with one embodiment of the present invention.

With reference to FIG. 19, depicted is an exemplary computing system for implementing embodiments. FIG. 19 includes a computer 100, which may be a stationary device or a portable device, wherein at least some or all of its components are formed together in a single device which can be carried around by a person. The computer 100 includes a processor 110, memory 120 and one or more drives or storage devices 130. Storage devices 130 include any device capable of storing data, information, or instructions, such as: a memory chip storage including RAM, ROM, EEPROM, EPROM or any other type of flash memory device; a magnetic storage devices including a hard or floppy disk, and magnetic tape; optical storage devices such as a CD-ROM disc, a BD-ROM disc, and a BluRay™ disc; and holographic storage devices.

The storage devices 130 and their associated computer storage media provide storage of computer readable instructions, data structures, program modules and other information for the computer 100. Storage devices 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a microphone, a camera, a video camera, a keyboard and a pointing device, commonly referred to as a mouse, trackball or touch pad. Other input devices may include a joystick, game pad, satellite dish, scanner, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers and/or display devices, which may be connected through an output peripheral interface 194 and the like.

Computer 100 also includes a radio 198 for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a remote computer. The remote computer may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN to environments such as the Internet. It will be appreciated that other means of establishing a communications link between the computers may be used.

According to one embodiment, computer 100 is connected in a networking environment such that processor 110 can process incoming and outgoing data. The incoming and outgoing data can be to and/or from a portable device or from another data source, such as another computer.

Figure 1:
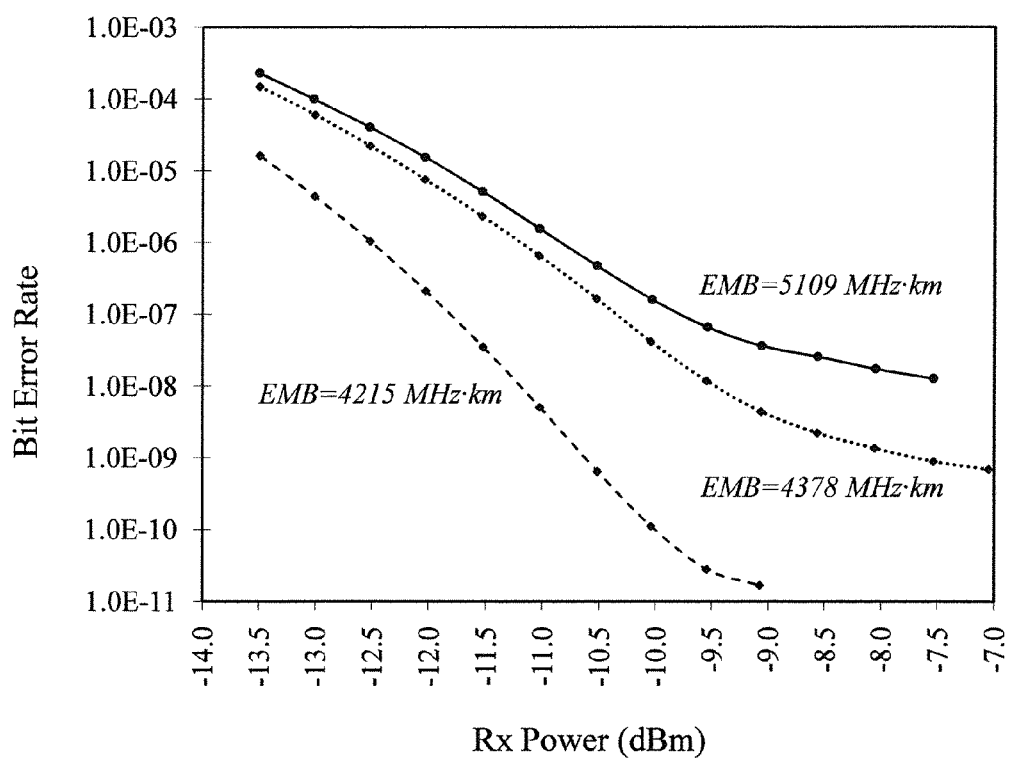
FIG. 1 depicts a graph of a measured bit-error-rate for three fibers (L=550 m) within the same cable that perform inversely proportional to the fiber EMB, in accordance with one embodiment of the present invention. This sample data highlights the shortcoming of the current EMB algorithm which should be proportional to BER.
Figure 2:
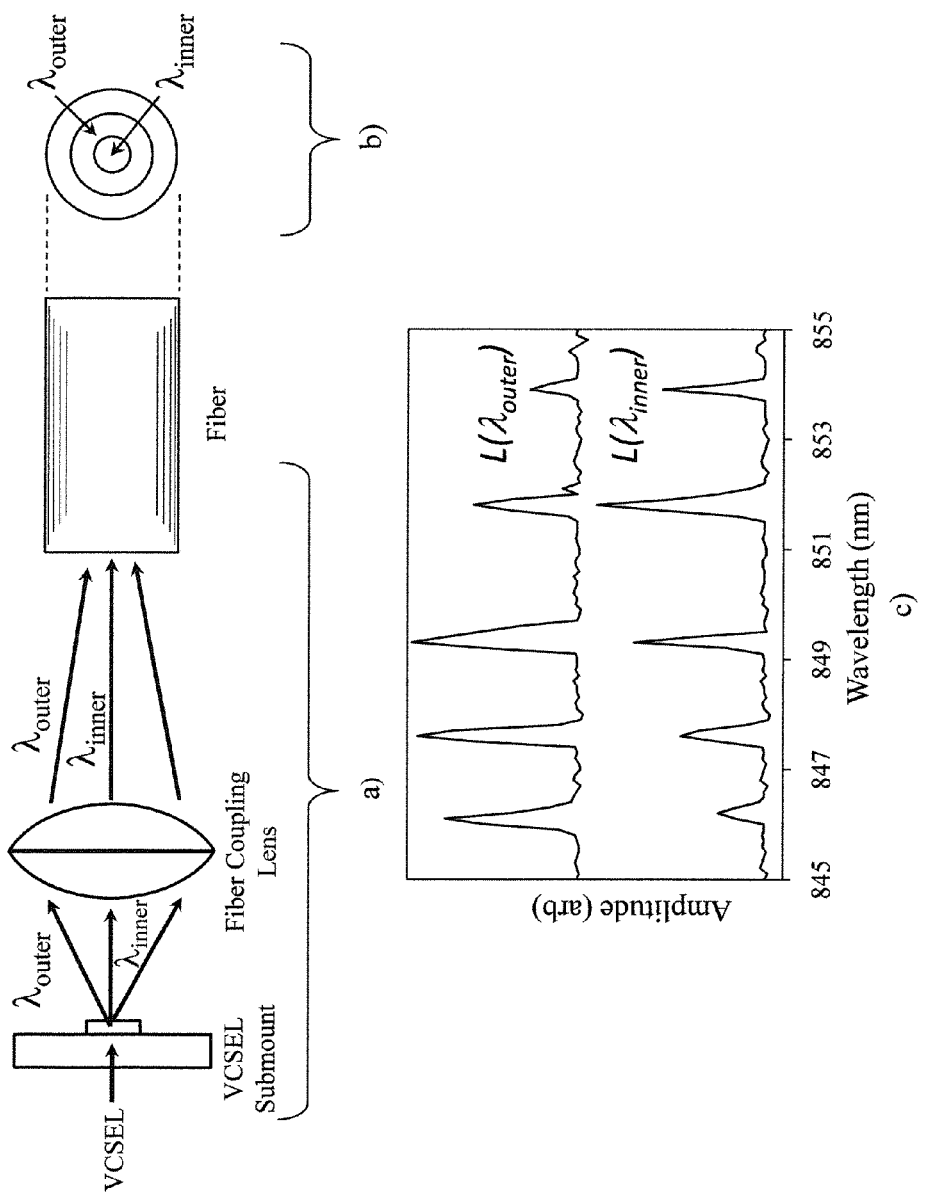
FIG. 2A depicts a schematic representation of a typical VCSEL-to-fiber coupling scheme that results in an inhomogeneous distribution of wavelengths across the fiber core (i.e. $L(\lambda_{inner}) \neq L(\lambda_{outer})$), in accordance with one embodiment of the present invention. In general, the inequality $L(\lambda_{inner}) \neq L(\lambda_{outer})$ originates due to the spatially varying emission spectra (and numerical aperture) of the VCSEL itself.
FIG. 2B depicts an end view of a simplified distribution of coupled $\lambda$'s laterally across the fiber, in accordance with one embodiment of the present invention.
FIG. 2C depicts a graph of the fiber coupled spectrum, $L(\lambda)$, measured at different locations of the fiber core corresponding to $\lambda_{inner}$ and $\lambda_{outer}$, in accordance with one embodiment of the present invention. Although the spectral components are largely identical, there is a shift in the magnitude of the components that effectively shifts the central wavelength.
Figure 3:
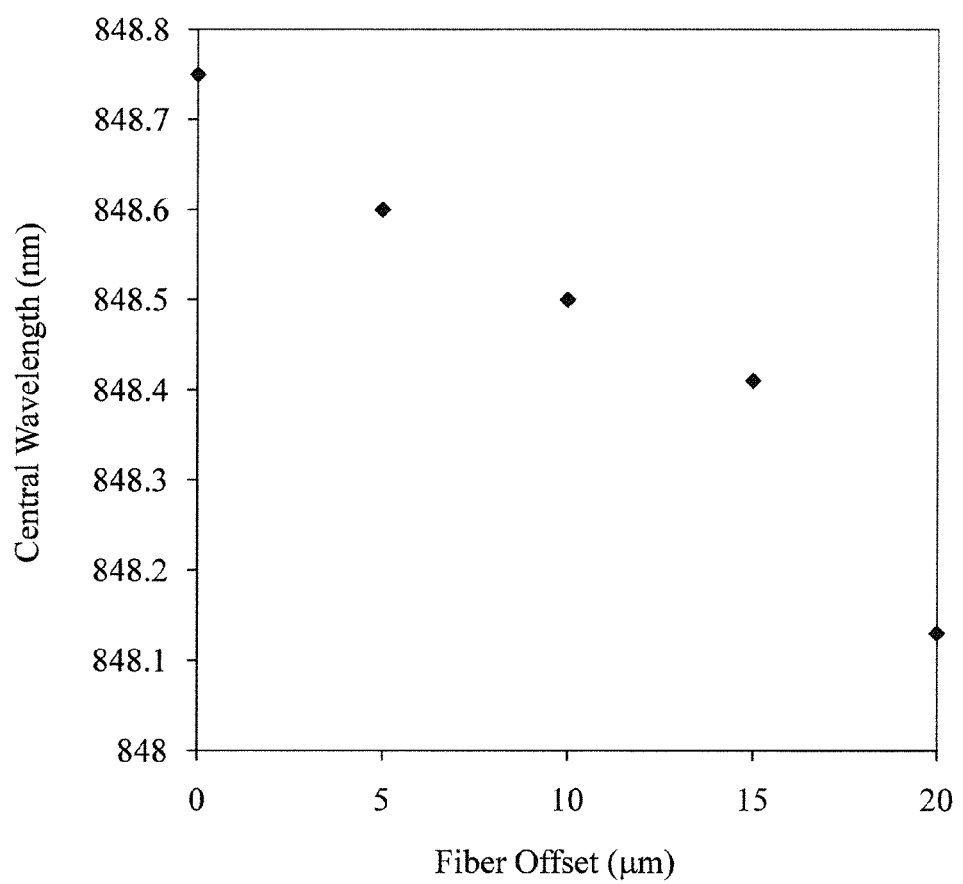
FIG. 3 depicts a graph of a measured central wavelength versus radial offset of fiber showing the inhomogeneous distribution of fiber-coupled spectral components, in accordance with one embodiment of the present invention. It is important to note that the slope of the central wavelength versus radial position is negative. In providing the measurements, a laser transmitter (VCSEL) was fiber-coupled to a multimode fiber optic cable (MMF). This MMF was then positioned in electronically addressable positioning stages. A SMF, which functioned as the collection fiber, was then scanned across the radius of the MMF.

With reference to FIGS. 2 and 3, a fiber-coupled wavelength spectrum may vary laterally across the fiber. The origin of this is shown schematically in FIG. 2 and measurement results are provided in FIG. 3. Recognizing the inhomogeneous nature of wavelengths within the fiber core allows a more precise and improved algorithm for calculating fiber bandwidth to be realized. The improved algorithm, with respect to that described above, is summarized in the following six steps. The improved algorithm may reside in storage device 130 and be computed on computer 100.

In a first step of the improved algorithm, the temporal responses of the multimode fiber optic cable, U(r,t), are measured using spectrally narrow and temporally short pulses of light with central wavelength, $\lambda_c$, injected into a core of the multimode fiber optic cable at series of radial offsets, r from the core.

In a second step of the improved algorithm, fiber chromatic dispersion transfer functions, $H_{cd}(f,r)$ are computed. In TIA-455-220-A the fiber chromatic dispersion transfer functions are calculated by multiplying the laser transmitter emitting spectrum, $L(\lambda,r)$, and the wavelength dependence of the time of flight, $TOF(\lambda)$.

$$H_{cd}(f,r)=FT\{L(\lambda,r)TOF(\lambda,_c)\} \tag{6a}$$

Alternate embodiments of the chromatic dispersion transfer functions may be calculated by:

$$H_{cd}(f,r)=FT\{L(t,r)\} \tag{6b}$$

Where the laser transmitter emitting spectrum is converted from the spectral domain, represented by $L(\lambda,r)$, into the time domain (length normalized) represented by, $L(t,r)$, using the normal dispersion equation given by:

$$t=-D\lambda \tag{6c}$$

and D is the chromatic dispersion parameter and has units of (ps/nm·km).

The second step of the improved algorithm is one difference between the standardized algorithm and the improved algorithm. In the improved algorithm, a series of chromatic dispersion transfer functions are calculated while in the standardized algorithm, only a single chromatic dispersion transfer function is computed. The series of chromatic transfer functions facilitates both the magnitude and time delay (phase shift) information across the core radius to be maintained and correctly added to, or subtracted from, the effects of modal dispersion.

In a third step of the improved algorithm, temporal responses of the fiber, $U_{cd}(r,t)$ are computed after the effects of chromatic dispersion by first convolving the Fourier Transform of the temporal responses of the fiber with the chromatic dispersion transfer functions and then taking the inverse Fourier Transform of the convolution to convert the responses of the fiber back to the time domain.

$$U_{cd}(r,t)=FT^{-1}\{FT\{U(r,t)\}\cdot H_{cd}(f,r)\} \tag{7}$$

where $FT^{-1}$ is the Inverse Fourier Transform function.

In a fourth step of the improved algorithm, chromatically dispersed weighted responses of the fiber, $D_{cd}(r,t,n)$, are computed with n DMD weighting functions, $W(r,n)$.

$$D_{cd}(r,t,n)=U_{cd}(r,t)W(r,n) \tag{8}$$

In a fifth step of the improved algorithm, a chromatically dispersed resultant output pulse, $P_{cd}(t,n)$, is computed by summing the weighted response, $U_{cd}(r,t)$ across all r.

$$P_{cd}(t,n)=\Sigma_r D_{cd}(r,t,n)=U_{cd}(r,t)W(r,n) \quad (9)$$

In a sixth step of the improved algorithm, a total fiber transfer function, $H_{fiber}(f,n)$ and a total calculated bandwidth, CB(n) are computed and preferably output on a display to a user. The total fiber transfer functions are determined by deconvolving the launch pulse, R(t), from the output pulses, $P_{cd}(t,n)$.

$$H_{fiber}(f,n)=FT\{P_{cd}(t,n)\}/FT\{R(t)\} \quad (10)$$

It should be noted that the improved algorithm is a generic algorithm that correctly accommodates arbitrary input functions of measured or modeled parameters (i.e. $U(r,t)$, $L(\lambda,r)$, $W(r,n)$). Therefore, the improved algorithm can be used to correctly quantify the bandwidth of fibers that exhibit DMD shifts to the 'left' (time advanced for increasing r) or 'right' (time delayed) that are used with transmitters that couple light into the fiber in an arbitrary manner.

The improved algorithm may be used for more accurately calculating a multimode fiber systems' bandwidth, which can then be advantageously applied in various ways. For example, practical applications include, but are not limited to the following.

In a first application, the improved algorithm may be used for optimization of the glass design of multimode fiber. Since it has been found, and is shown in Examples 1 and 2 below, that the total system bandwidth is increased when modal and chromatic dispersion effects are subtractive, knowledge of the chromatic dispersion parameters (fiber-coupled spectrum and time of flight) allows one to determine the modal dispersion parameters (temporal responses of the fiber) that would effectively cancel each other. Furthermore, since the temporal responses of the fiber are dependent upon the fiber refractive index profile, an optimum refractive index profile may be designed.

In a second application, the improved algorithm may be used for improved bandwidth measurements and calculations that more accurately correlate with measured system performance metrics (e.g., BER). Moreover, the improved bandwidth measurements and calculations can be employed to improve the accuracy of optical communication system models.

In a third application, the improved algorithm may be used for improved understanding of the effects the laser transmitter spectrum has on system performance.

In a fourth application, the improved algorithm may be used for an improved understanding of the effects the fiber coupled spectrum has on system performance.

In a fifth application, the improved algorithm may be used in software run on a computer 100 to optimize the glass design of multimode fiber and to provide more accurate optical communication system models.

EXAMPLE 1

A simplified example of the standardized algorithm for calculating bandwidth and illustrate differences between the improved algorithm is provided below. Initially, the standardized algorithm is described with respect to the steps described above.

Figure 4:
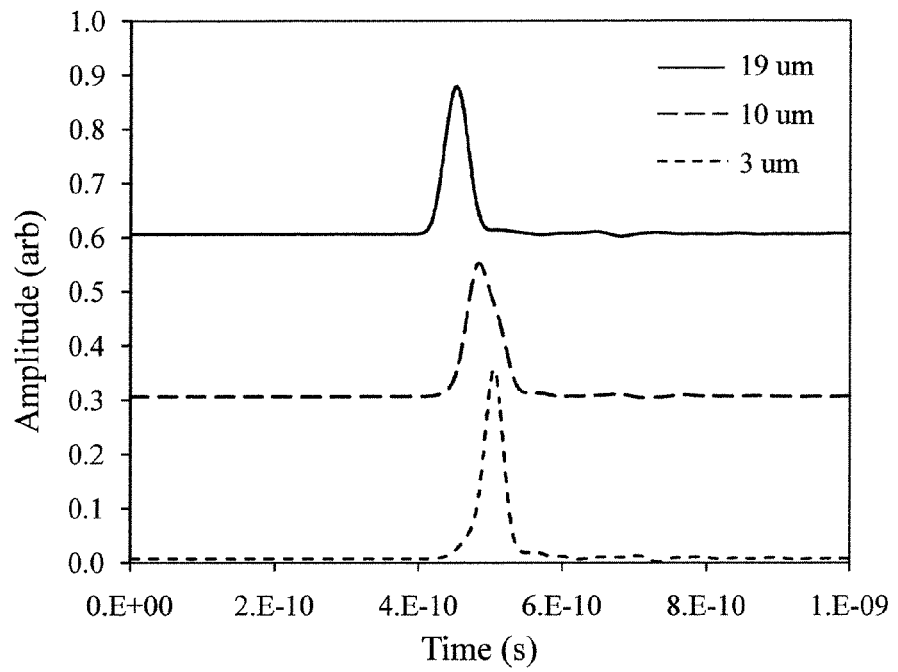
FIG. 4 depicts a graph of measured temporal responses for a particular fiber under test, $U(r,t)$, in accordance with one embodiment of the present invention. For simplicity, only 3 offsets (3, 10 and 19 μm) are shown in the graph.

With reference to FIG. 4, in a first step of the standardized algorithm the temporal responses for a particular fiber under test are measured, $U(r,t)$. For simplicity, only three offsets (3, 10 and 19 µm) are shown in the analysis. The temporal responses are measured data from fiber sample C26 Blue. It should be noted that these temporal responses shift to the 'left' and thus as r increases, the arrival time is reduced.

Figure 5:
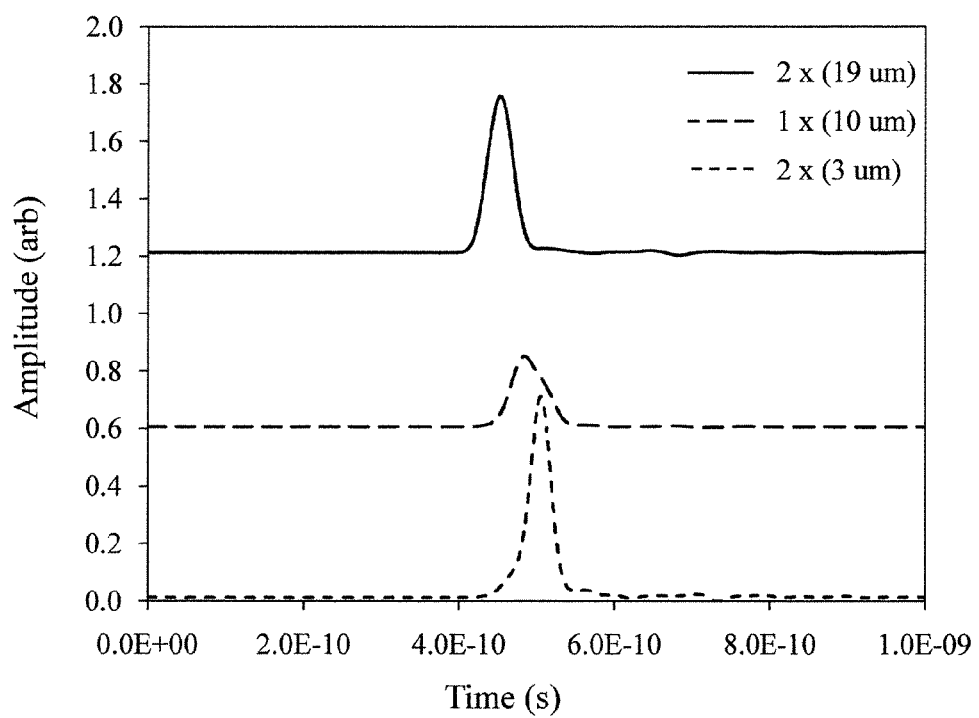
FIG. 5 depicts a graph of weighted temporal responses for a particular fiber after a weighting function is applied, in accordance with one embodiment of the present invention.

With reference to FIG. 5, in a second step of the standardized algorithm, only a single DMD weighting function (n=1) is used and W(3 µm,1)=2, W(10 µm,1)=1, W(19 µm,1)=2. The weighted temporal responses are shown graphically in FIG. 5.

Figure 6:
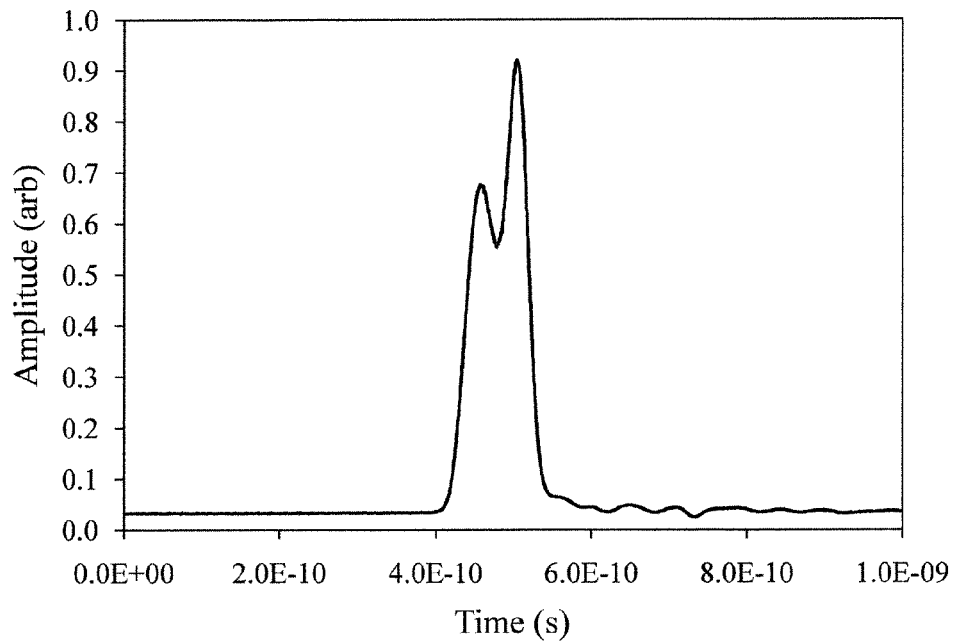
FIG. 6 depicts a graph of a resultant output pulse $P_o(t,1)$ which is simply the sum of the weighted temporal responses shown in FIG. 5, in accordance with one embodiment of the present invention.
Figure 7:
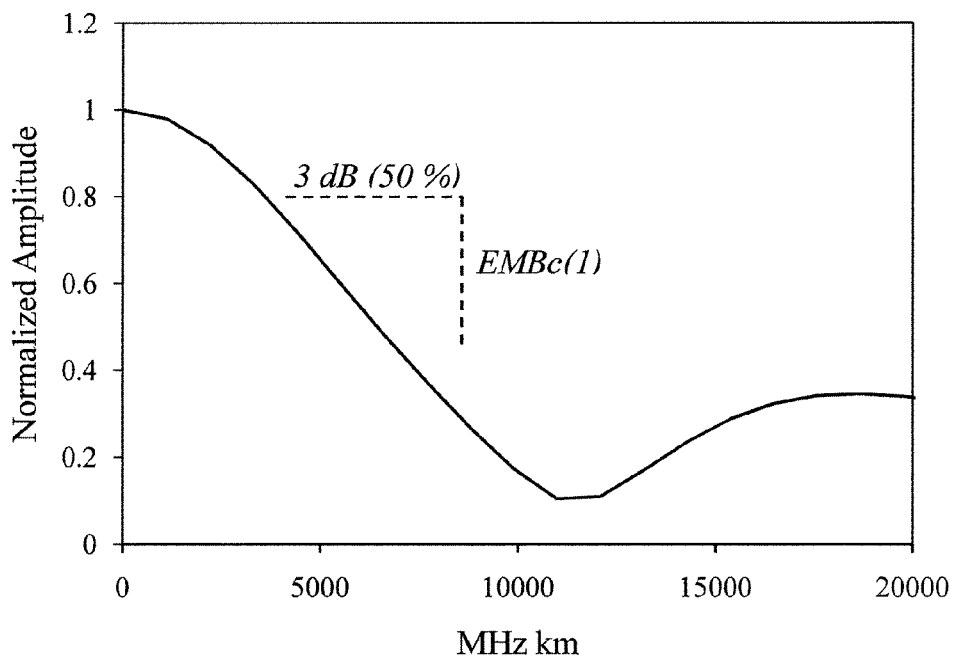
FIG. 7 depicts a graph of a fiber modal dispersion transfer function, $H_{md}(f,1)$, computed by taking the quotient of a Fourier Transform of a resultant output pulse, $P_o(t,1)$ and a Fourier Transform of a launch pulse, $R(t)$, in accordance with one embodiment of the present invention.

With reference to FIG. 6, in a third step of the standardized algorithm the resultant output pulse $P_o(t,1)$ is simply the sum of the weighted responses and is shown in FIG. 6. The fiber modal dispersion transfer function, $H_{md}(f,1)$ is computed by taking the quotient of the Fourier Transform of the resultant output pulse, $P_o(t,1)$ and the Fourier Transform of the launch pulse, R(t). This results in a graphical solution are shown in FIG. 7 which has been normalized in amplitude and against the fiber length (L=550 m). If only the modal bandwidth were to be considered and the 3 dB (50%) point were used as the bandwidth threshold, the EMBc(1) for this sample would be 6435 MHz·km (shown by the dashed lines).

Figure 8:
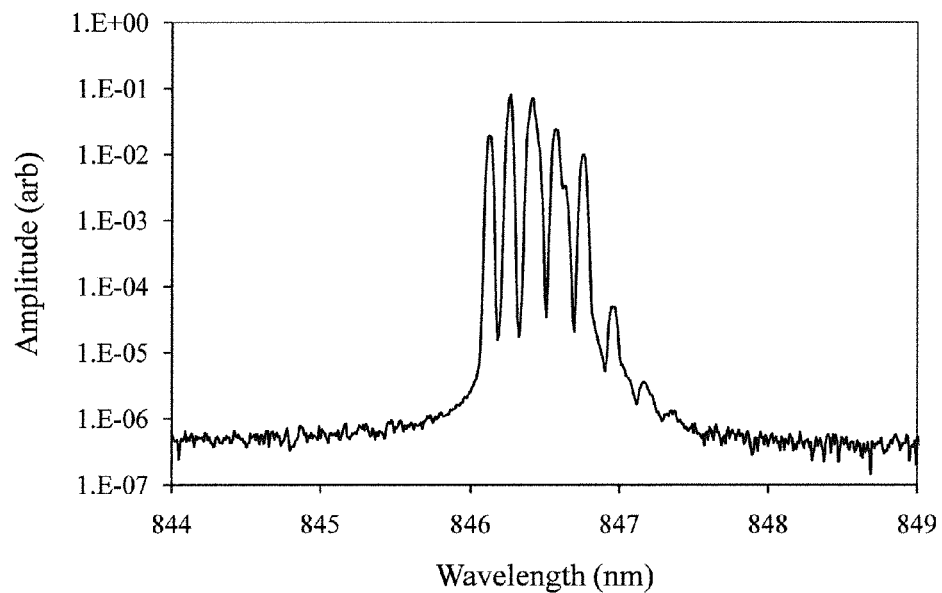
FIG. 8 depicts a graph of emitting spectra of a laser transmitter, in accordance with one embodiment of the present invention.
Figure 9:
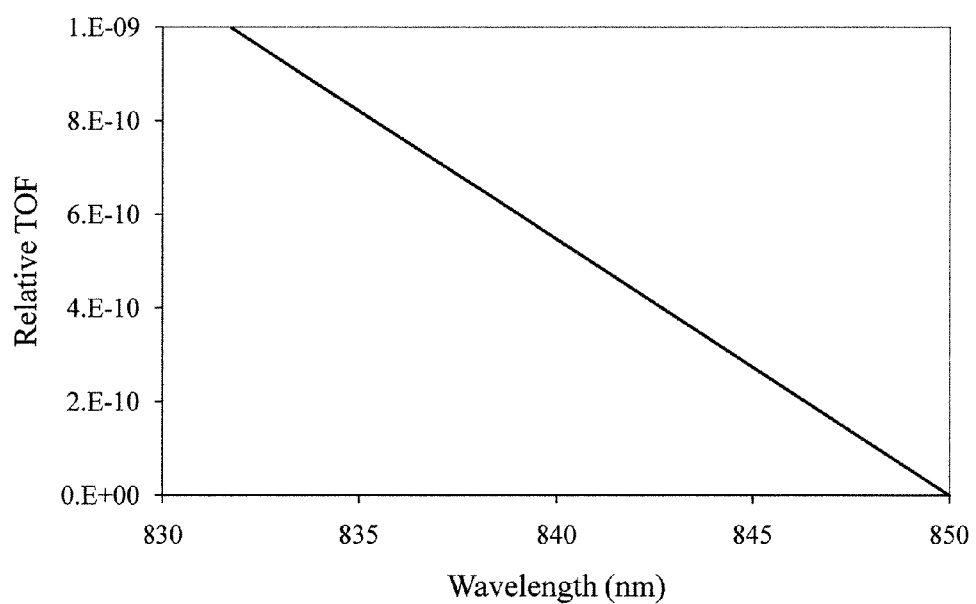
FIG. 9 depicts a graph of a measured time of flight of a fiber versus wavelength, in accordance with one embodiment of the present invention.

If the total calculated bandwidth, CB(1) were to be computed using the prior art algorithm, the chromatic dispersion effects of the laser transmitter would be combined with the fiber modal dispersion transfer function, $H_{md}(f,1)$. According to TIA-455-220-A, the chromatic dispersion transfer function is simply the product of the emitting spectra of the laser transmitter (FIG. 8) and the measured time of flight of the fiber versus wavelength (FIG. 9). The laser emitting spectrum is measured data from the JDSU 10 Gb/s bit-error-rate test transmitter. The time of flight data is measured data from fiber sample C26 Blue.

Figure 10:
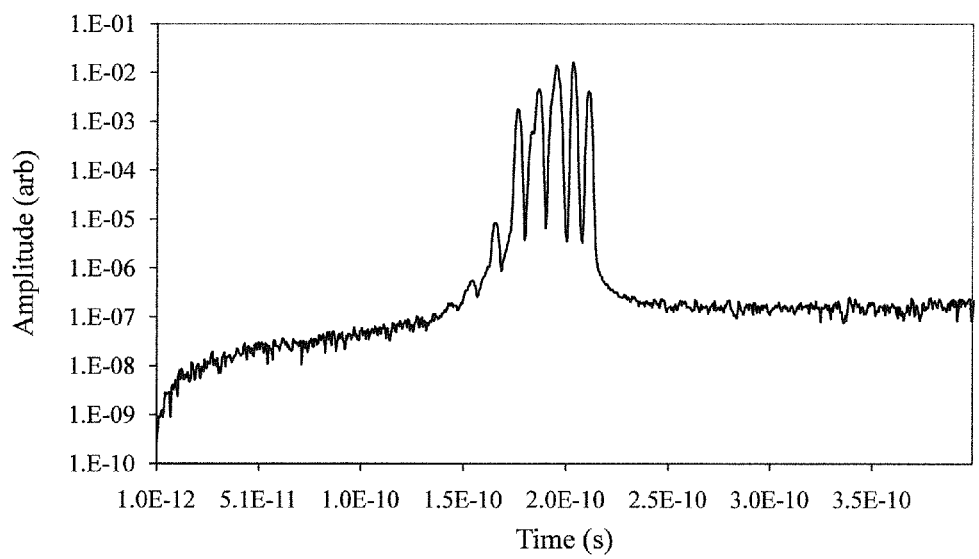
FIG. 10 depicts a graph of the product of the emitting spectra of a laser transmitter shown in FIG. 8 and the measured time of flight of a fiber versus wavelength shown in FIG. 9, in accordance with one embodiment of the present invention.
Figure 11:
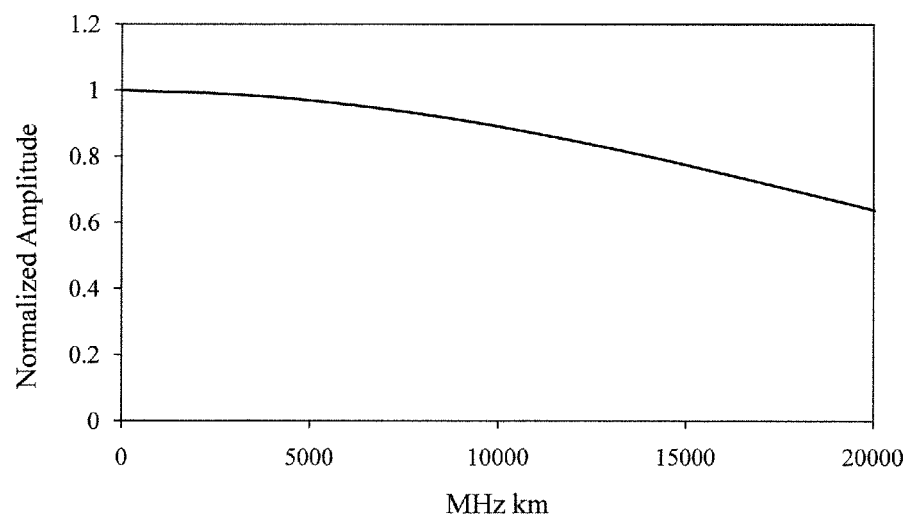
FIG. 11 depicts a graph of a chromatic dispersion transfer function, in accordance with one embodiment of the present invention.

The product of the emitting spectra of the laser transmitter and the measured time of flight of the fiber versus wavelength is shown in FIG. 10. Finally, the chromatic dispersion transfer function is determined and shown in FIG. 11.

Figure 12:
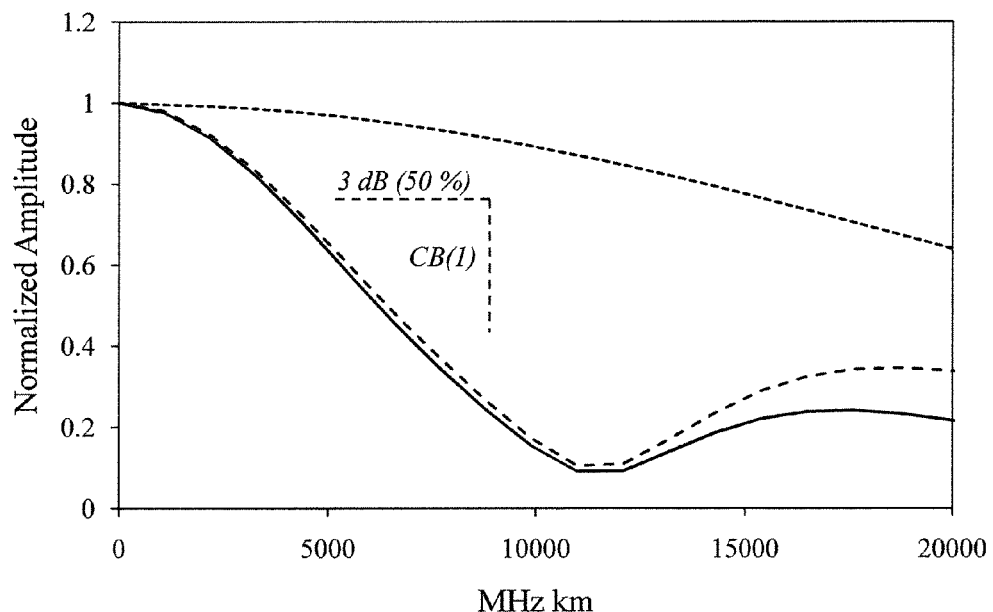
FIG. 12 depicts a graph of the total calculated bandwidth, CB(1), in accordance with one embodiment of the present invention.

With reference to FIG. 12, in a fourth step of the standardized algorithm, the total calculated bandwidth, CB(1) is the convolution of the fiber modal dispersion transfer function, $H_{md}(f,1)$ and the chromatic dispersion transfer function, $H_{cd}(f)$. The CB(1), shown with the solid line in FIG. 12, for this sample would be 6221 MHz·km.

It is essential to note that when using the standardized algorithm, the calculated bandwidth cannot exceed the magnitude of either the modal or chromatic dispersion transfer functions. Consequently, the standardized algorithm cannot accommodate the known case were chromatic and modal dispersion effects are subtractive and therefore the calculated bandwidth exceeds the magnitude of the chromatic and modal dispersion transfer functions. The improved algorithm of the present invention accommodates for this situation.

EXAMPLE 2

A simplified example demonstrating the improved algorithm, again with respect to both the procedure described above and the previous Example 1, is provided below.

With reference to FIG. 4, in a first step of the improved algorithm the temporal responses for a particular fiber under test are measured at r=3, 10 and 19 µm and are shown in FIG. 4.

Figure 13:
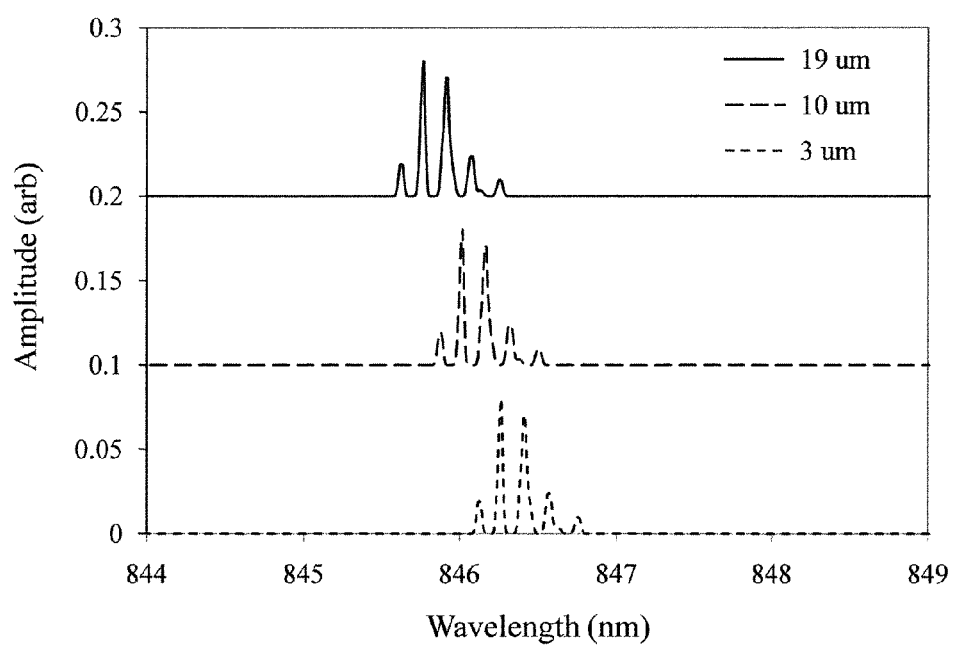
FIG. 13 depicts a graph of the dependence of spectrum on radial offset used for Example 2, in accordance with one embodiment of the present invention.

With reference to FIG. 13, in a second step of the improved algorithm the chromatic dispersion transfer functions at the radial offsets, $H_{cd}(f,r)$ are determined. Since the transfer functions are determined at each radial offset, the time delay (phase shift) information between the radial offsets is conserved. This essential concept, incorporated after recognizing the inhomogeneous nature of wavelengths within the fiber core, enables the improved algorithm. The dependence of spectrum on radial offset used in this example calculation is shown in FIG. 13.

Figure 14:
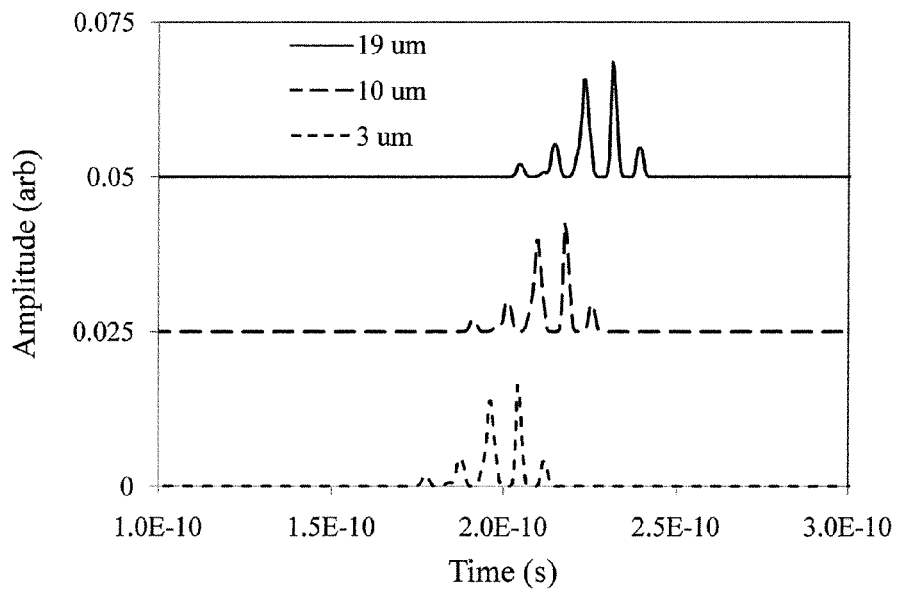
FIG. 14 depicts a graph of three chromatic dispersion transfer functions: $H_{cd}(f,3 \mu m)$, $H_{cd}(f,10 \mu m)$ and $H_{cd}(f,19 \mu m)$, in accordance with one embodiment of the present invention.

This allows the calculation of three chromatic dispersion transfer functions: $H_{cd}(f,3 \mu m)$, $H_{cd}(f,10 \mu m)$ and $H_{cd}(f,19 \mu m)$ to be determined and shown in FIG. 14 (similar to FIG. 9 but with a linear scale).

Figure 15:
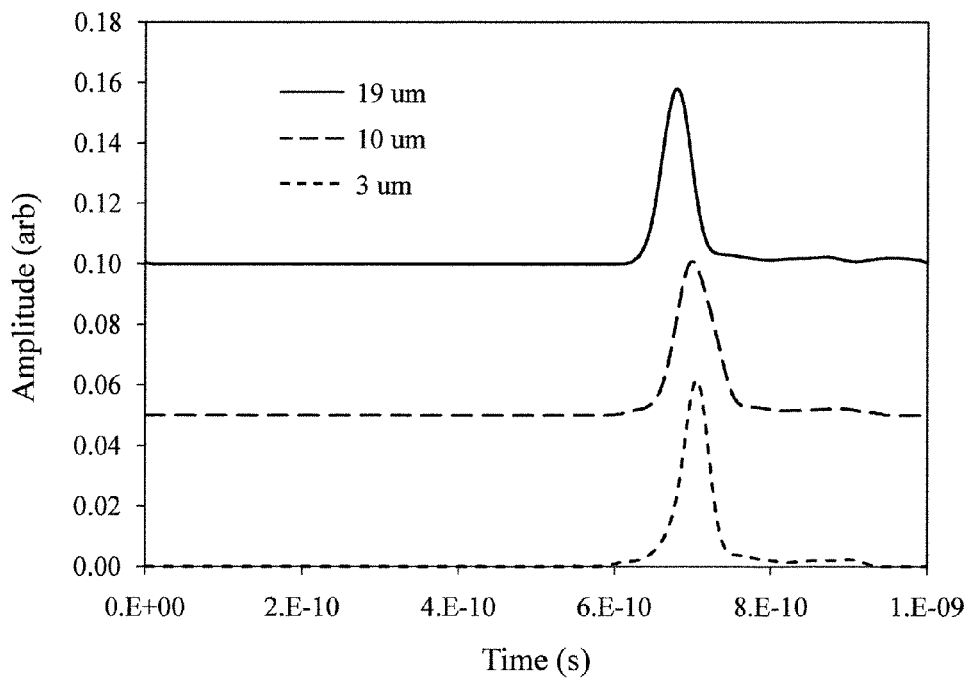
FIG. 15 depicts a graph of resulting waveforms for three waveforms of original temporal responses of a fiber before undergoing chromatic dispersion, $U_{cd}(r,t)$, in accordance with one embodiment of the present invention.
Figure 16A:
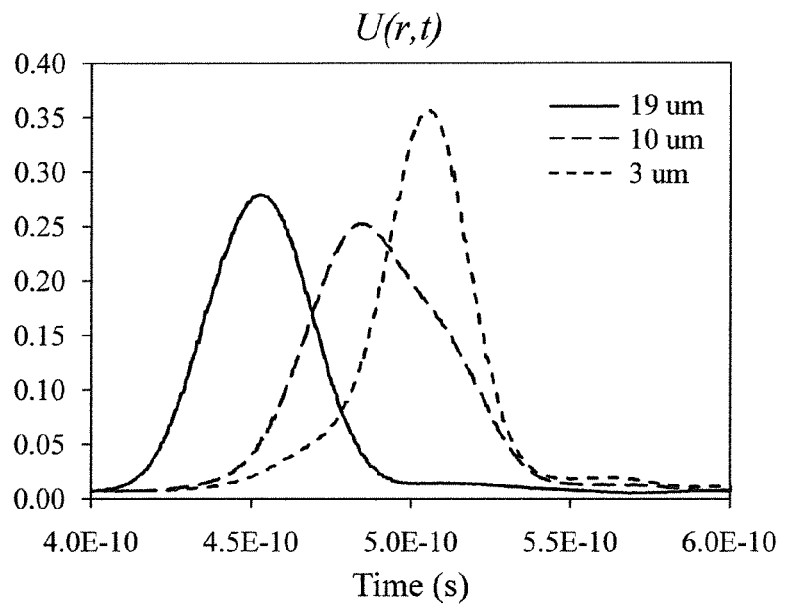
FIG. 16A depicts a graph of overlapping waveforms for three waveforms of original temporal responses of a fiber before undergoing chromatic dispersion, $U(r,t)$, in accordance with one embodiment of the present invention.
Figure 16B:
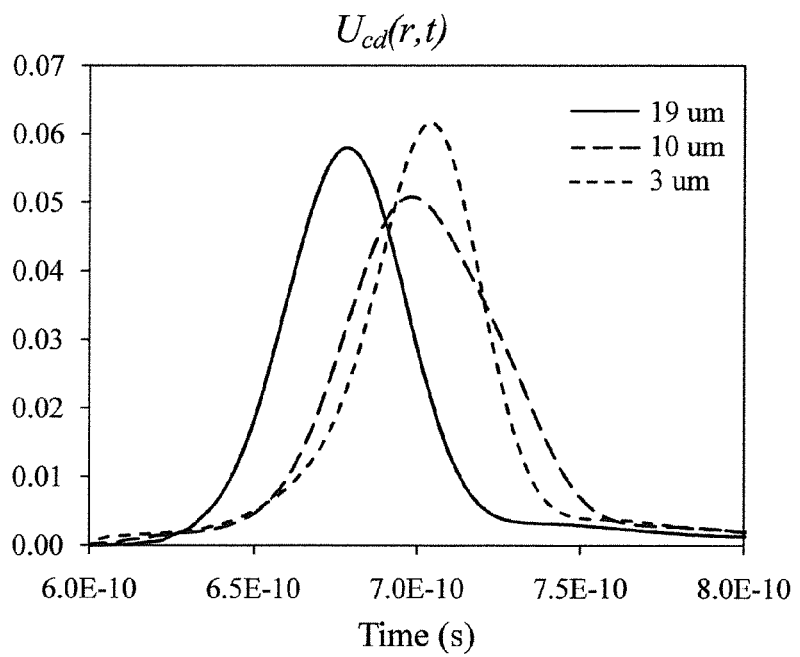
FIG. 16B depicts a graph of overlapping resulting waveforms for three waveforms of original temporal responses of a fiber after undergoing chromatic dispersion, $U_{cd}(r,t)$, in accordance with one embodiment of the present invention.

With reference to FIG. 15, in a third step of the improved algorithm using the chromatic dispersion transfer functions, the three waveforms of original temporal responses of the fiber after undergoing chromatic dispersion, $U_{cd}(r,t)$ are calculated according Equation 7. The resulting waveforms are shown in FIG. 15.

Comparing FIG. 15 and FIG. 4, it is noted that the pulses are shifted in time proportional to their relative time of flight shown in FIG. 9 (approximately +200 ps). The relative time shift between the three waveforms, is the result of the inhomogeneous nature of wavelengths within the fiber core and the effects of chromatic dispersion. Removing the artificial offsets of the waveforms facilitates observation of this conclusion graphically. Note the differences in peaks between the 3 μm waveform and the 19 μm waveform.

Figure 17:
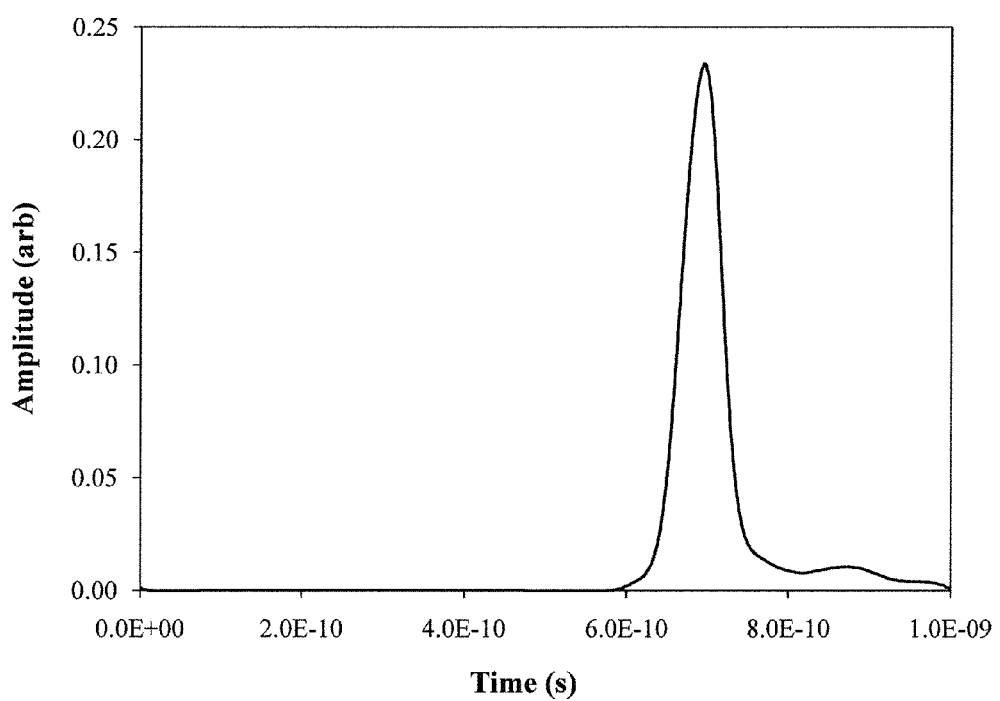
FIG. 17 depicts a graph of a weighted resultant output pulse $P_{cd}(t,1)$, in accordance with one embodiment of the present invention.

With reference to FIG. 17, in a fourth and fifth steps of the improved algorithm the weighted resultant output pulse $P_{cd}(t,1)$ is shown graphically in FIG. 17 and is analogous to the weighted resultant output pulse shown in FIG. 6.

Figure 18:
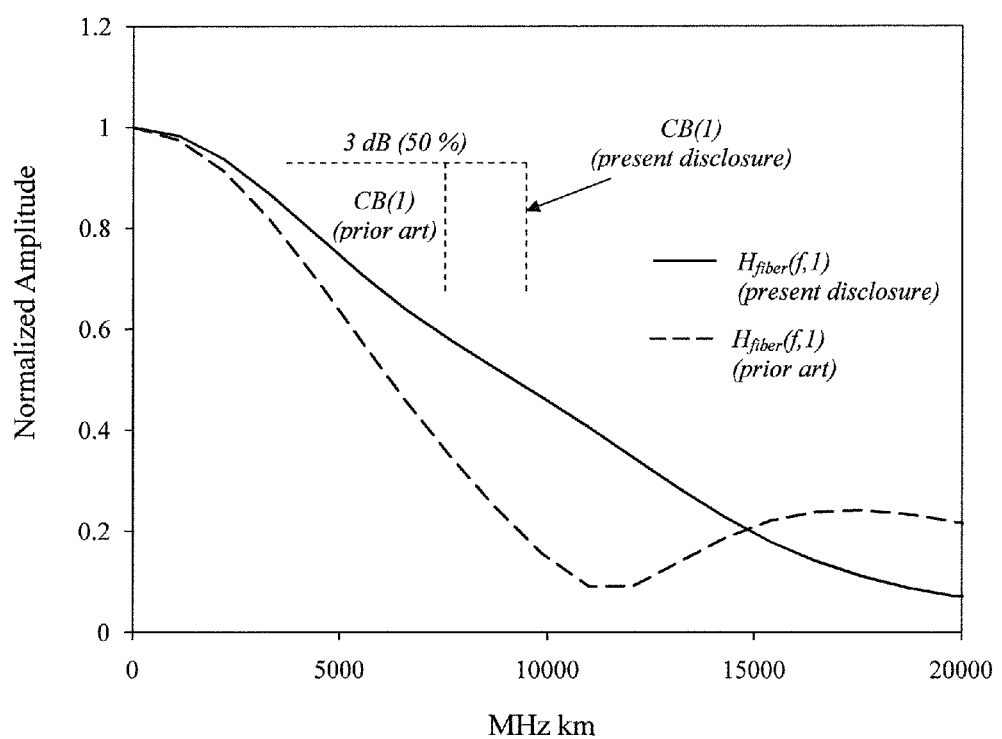
FIG. 18 depicts a graph of the total fiber transfer function, $H_{fiber}(f,1)$ of the present disclosure versus that of the prior art and the calculated bandwidth, CB(1), of the present disclosure versus that of the prior art, in accordance with one embodiment of the present invention.

With reference to FIG. 18, in a sixth step of the improved algorithm the total fiber transfer function, $H_{fiber}(f,1)$, as determined by the present invention, is determined. The calculated bandwidth, CB(1), for this example is 9184 MHz·km which correctly demonstrates the compensating effects of modal and chromatic dispersion (prior art CB(1)=6221 MHz·km).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A computer program stored on a computer readable storage device for carrying out a method for calculating a bandwidth of a laser source and a multimode fiber optic cable, wherein the method accounts for both modal and chromatic dispersion effects within the multimode fiber optic cable, the method comprising:

measuring temporal responses of the multimode fiber optic cable, $U(r,t)$, using pulses of light with a central wavelength, $\lambda_c$, injected into a core of the multimode fiber optic cable at series of radial offsets, r from the core;

computing a plurality of fiber chromatic dispersion transfer functions, $H_{cd}(f,r)$ wherein said plurality of fiber chromatic dispersion transfer functions are used to relate output pulses of light to input pulses of light after chromatic dispersion at series of radial offsets r; and outputting a total calculated bandwidth, $CB(n)$ which was computed using the plurality of fiber chromatic dispersion transfer functions, $H_{cd}(f,r)$, on a display.

2. A computer system including a computer and the computer program of claim 1 for carrying out the method for calculating a bandwidth of a laser source and a multimode fiber optic cable, wherein the method accounts for both modal and chromatic dispersion effects within the multimode fiber optic cable.

3. The computer program of claim 1, wherein the method further comprises:

computing temporal responses of the multimode fiber optic cable, $U_{cd}(r,t)$ after effects of chromatic dispersion by first convolving a Fourier Transform of the temporal responses of the multimode fiber optic cable with the plurality of fiber chromatic dispersion transfer functions and then taking an inverse Fourier Transform of the convolution to convert the temporal responses of the multimode fiber optic cable back to time domain.

4. The computer program of claim 3, wherein the method further comprises:

computing chromatically dispersed weighted responses of the multimode fiber optic cable, $D_{cd}(r,t,n)$, with n DMD weighting functions, $W(r,n)$.

5. The computer program of claim 4, wherein the method further comprises:

computing a chromatically dispersed resultant output pulse, $P_{cd}(t,n)$, by summing the weighted response, $U_{cd}(r,t)$ across all radii, r.

6. The computer program of claim 5, wherein the method further comprises:

computing a total fiber transfer function, $H_{fiber}(f,n)$ and the total calculated bandwidth, $CB(n)$; and outputting the total fiber transfer function, $H_{fiber}(f,n)$ and the total calculated bandwidth, $CB(n)$ on a display.

7. A method for designing an improved multimode fiber optic cable which compensates for a radially dependent wavelength distribution of laser launch modes coupled into a reference multimode fiber optic cable, the method comprising:

measuring temporal responses of a reference multimode fiber optic cable, $U(r,t)$, using spectrally narrow and temporally short pulses of light radiation launched into the reference multimode fiber optic cable using a laser, wherein the pulses of light have a central wavelength, $\lambda_c$, and wherein the pulses of light are launched into a core of the reference multimode fiber optic cable at series of radial offsets, r from the core;

computing a plurality of fiber chromatic dispersion transfer functions, $H_{cd}(f,r)$, wherein said plurality of fiber chromatic dispersion transfer functions are used to relate output pulses of light to input pulses of light after chromatic dispersion at series of radial offsets r;

determining an amount of modal dispersion within the reference multimode fiber optic cable resulting from the pulses of light radiation launched into the reference multimode fiber optic cable by using the plurality of fiber chromatic dispersion transfer functions; and designing the improved multimode fiber optic cable having an improved refractive index profile which compensates for at least a portion of the radially dependent wavelength distribution of laser launch modes coupled into the reference multimode fiber optic cable, wherein at least one of the method steps is performed by a computer having a processor.

8. An improved multimode fiber optic cable designed using the method of claim 7.

9. A method for designing an improved multimode fiber optic cable which compensates for a radially dependent wavelength distribution of laser launch modes of a reference laser, the method comprising:

measuring temporal responses of the multimode fiber optic cable, $U(r,t)$, using pulses of light with a central wavelength, $\lambda_c$, injected into a core of the multimode fiber optic cable at series of radial offsets, r from the core;

computing a plurality of fiber chromatic dispersion transfer functions, $H_{cd}(f,r)$, wherein said plurality of fiber chromatic dispersion transfer functions are used to relate output pulses of light to input pulses of light after chromatic dispersion at series of radial offsets r; and computing an amount of modal dispersion effects within the improved multimode fiber optic cable needed to cancel chromatic dispersion effects within the improved multimode fiber optic cable and maximize bandwidth of the improved multimode fiber optic cable using the plurality of fiber chromatic dispersion transfer functions, wherein at least one of the method steps is performed by a computer having a processor.

10. An improved multimode fiber optic cable designed using the method of claim 9.

11. The method of claim 9 further comprising designing the improved multimode fiber optic cable having an improved refractive index profile which compensates for at least a portion of the radially dependent wavelength distribution of laser launch modes coupled into the reference multimode fiber optic cable.

* * * * *